United States Patent [19]
Lowe

[11] Patent Number: 6,130,733
[45] Date of Patent: Oct. 10, 2000

[54] LIGHT SCATTERING DISPLAY HAVING A STRUCTURED SOLID STATE SELECTIVITY REFLECTIVE LAYER FORMED INSIDE THE DISPLAY CELL

[75] Inventor: Anthony Cyril Lowe, Braishfield, United Kingdom

[73] Assignee: International Business Machines Corporation, Armonk, N.Y.

[21] Appl. No.: 09/154,019

[22] Filed: Sep. 16, 1998

[51] Int. Cl.[7] .................................................. G02F 1/1335
[52] U.S. Cl. ............................................. 349/86; 349/113
[58] Field of Search .................................. 349/62, 64, 96, 349/97, 86, 113, 56, 104

[56] References Cited

U.S. PATENT DOCUMENTS

| | | | |
|---|---|---|---|
| 5,408,344 | 4/1995 | Takiguchi et al. ......................... | 349/57 |
| 5,691,790 | 11/1997 | Havens et al. ........................... | 349/113 |
| 5,796,454 | 8/1998 | Ma ............................................ | 349/98 |
| 5,828,488 | 10/1998 | Ouderkirk et al. ....................... | 349/96 |
| 5,929,956 | 7/1999 | Neijzen et al. ........................... | 349/113 |

*Primary Examiner*—Kenneth Parker
*Attorney, Agent, or Firm*—Scully, Scott, Murphy & Presser; Daniel P. Morris, Esq.

[57] ABSTRACT

A display device having a selectively reflective layer inside the display cell is described. By incorporating the selectively reflective layer inside the display cell itself, enhanced reflectivity is produced from the scattering state, but the problem of parallax is substantially avoided.

16 Claims, 5 Drawing Sheets

LIGHT SCATTERING DISPLAY HAVING A STRUCTURED SOLID STATE SELECTIVITY REFLECTIVE LAYER FORMED INSIDE THE DISPLAY CELL

DESCRIPTION

1. Field of the Invention

The present invention relates to a reflective display and in particular to a means of increasing the light reflected by a reflective display without introducing parallax between the primary and reflected images.

2. Background of the Invention

Liquid crystal displays which switch between a transparent (black) and a light scattering (white) state have insufficient back scattering efficiency to achieve adequate reflectivity in the scattering state. This is because the liquid crystal structures which scatter light do so predominantly in the forward direction, whereas efficient display operation requires light to be back scattered.

Two approaches are known in the prior art to increase the fraction of light back scattered towards the observer. One of these approaches is to increase the thickness of the liquid crystal layer. This approach however results in unacceptably thick liquid crystal layers (the thickness of which approaches the pixel dimension), which have extremely high switching voltages, yet still exhibit inadequate back scattering efficiency.

Another approach employed in the prior art to increase the fraction of light scattered back towards the observer is to utilize a prism sheet, i.e., a selectively reflective material, external to the display cell. The external prism sheet is designed to reflect none of the light transmitted by the liquid crystal layer in its transparent state. Instead, it reflects a portion of the light scattered by the liquid crystal layer in the forward direction in its scattering state back through the liquid crystal layer, where it is scattered a second time, predominantly back towards the viewer.

This approach is illustrated in FIG. 1. Specifically, FIG. 1 shows a vertical cross-sectional view through a display cell 10 as described in the prior art comprising a first transparent substrate 20, a second transparent substrate 22, a layer of liquid crystals 24 and an external prism film 26. The substrates 20 and 22 are patterned with a transparent electrode material and layers to align the liquid crystal layer. For clarity, those layers are not shown in this figure. An image 30 is created in the liquid crystal layer by the application of an electric field between transparent substrates 20 and 22. Thermal means can also be employed to generate the image. When viewed at normal incidence in the direction of arrow 32, the reflected image 34 of image 30 formed in the external prism is coincident with image 30. However, when the display is viewed at an off-normal angle, such as the direction of arrow 36, reflected image 34 is laterally displaced with respect to image 30 in the direction of arrow 38 and appears in position 40. Thus, the information presented on the display is destroyed by the reflected image from one pixel being superimposed on the primary image of an adjacent pixel or even on pixels beyond the adjacent pixels.

The latter approach, which is illustrated in FIG. 1, has the disadvantage that the image formed by reflection in the prism film is located a substantial distance behind the plane of the liquid crystal layer. This produces unacceptable parallax between the reflected and the primary images when the display is viewed from a direction which is not normal to the display plane. This is particularly problematic in the case of high density displays in which the pixel pitch is of the order of one magnitude less than the display substrate thickness.

In view of the above-mentioned drawbacks with prior art approaches for increasing the fraction of light being back scattered towards an observer, there is a continued need for developing new and improved reflective display devices which are capable of increasing the light reflected without introducing parallax between the primary and reflected images.

SUMMARY OF THE INVENTION

The present invention provides a means by which the properties of an external prism film, which relies on refraction and total internal reflection at solid-air interfaces, is produced in a solid state structure on the surface of the rear pixel electrode inside the display cell. By employing this means rather than the external means illustrated by FIG. 1, enhanced reflectivity is produced from the scattering state, but the problem of parallax is avoided.

DETAILED DESCRIPTION OF THE INVENTION

Figure 1:
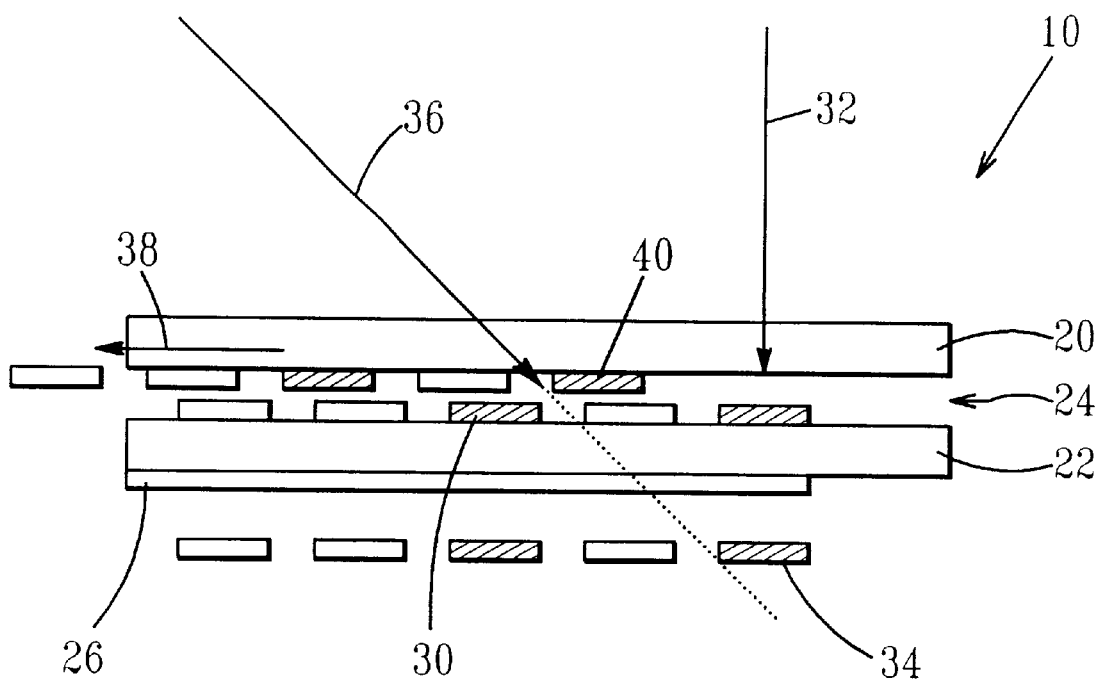
FIG. 1 is a vertical cross-sectional view of a display cell 10 as described in the prior art wherein external prism 26 is employed.

The present invention which provides a means for increasing the light reflected by a reflective display without introducing parallax between the primary and reflected images will now be described in greater detail by referring to the drawings that accompany this application. It should be noted that like and corresponding elements or components of the drawings are described by like reference numerals.

As stated briefly above, the performance of reflective displays which rely on back scattering incident light to achieve a white state is limited by the back scattering efficiency of the display transducer. Often the transducer will be a liquid crystal such as a reverse-mode polymer stabilized cholesteric structure (RM-PSCT) or a polymer dispersed liquid crystal (PDLC), but, while these are used as examples, the present invention applies to any reflective display which can be switched between a transparent and a scattering state. The back scattering efficiency of RM-PSCT or any other scattering effect display can be improved by placing a structure behind the liquid crystal layer which transmits light refracted through the display in its transparent state, for which the maximum angle of propagation is the critical angle, $\phi_c$, but reflects light propagating through the display at angles greater than the critical angle. This effect is described in A. Kanemoto, et al., Conference Record of the International Display Research Conference, 183, (1994).

In a typical light scattering liquid crystal, only a minor fraction of the light is back scattered and the majority is forward scattered. A portion of the forward scattered light will propagate at angles greater than the critical angle and it is this light which the selective reflector reflects and redirects back through the liquid crystal layer. If, the selective reflector is positioned outside the display cell, the reflecting surface of the prism film is separated from the plane of the liquid crystal layer by the sum of the thickness of the cell glass and the prism film, or approximately 1.5–2 mm. Consequently considerable parallax is observed, as shown in FIG. 1, making the prior art approach unsuitable for high pixel density displays.

The present invention, on the other hand, relates to the formation of a structure with the required properties on the surface of the pixel electrode, avoiding the parallax problem. That is, the required properties are located inside the display cell itself, not outside as is illustrated in FIG. 1.

Figure 2:
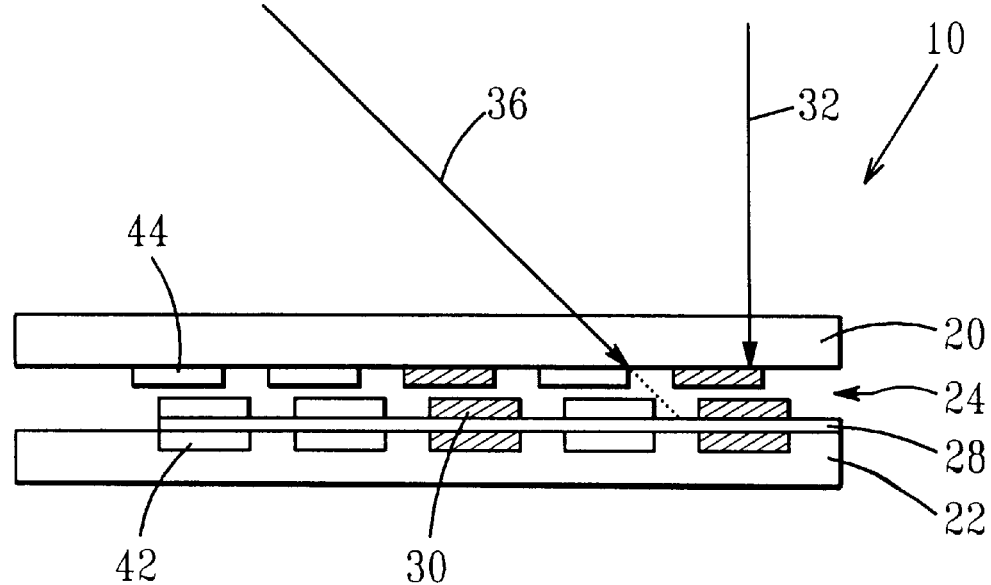
FIG. 2 is a vertical cross-sectional view of a display cell 10 which is prepared in accordance with the present invention, i.e. selectively reflector layer 28 is formed on the inside of the cell.

Reference in this regard is made to FIG. 2 which shows a cross-sectional view of a cell constructed in accordance with the present invention. As in FIG. 1, the cell of the present invention comprises a first transparent substrate 20, a second transparent substrate 22 and a liquid crystal layer 24 positioned between the first and second transparent substrates. A selectively reflector layer 28 is formed on the inside surface of second transparent substrate 22. Thus, unlike prior art reflective displays wherein the reflective element is located outside the display, in the present invention the reflective element is located within the display itself. The selectively reflector layer has a thickness of from about 1 μm or above. More preferably, the thickness of the selectively reflective layer is from about 1 to about 4 μm.

An image 30 is formed in liquid crystal layer 24 and its reflected image 42 formed in selectively reflector layer 28 is located in a plane only about 1.5 to about 4 μm behind the plane of the liquid crystal layer. No significant lateral displacement of reflected image 42 and image 30 occurs when the display is viewed in the direction of arrow 36, the parallax between reflected image 42 and image 30 is so small that only a minor displacement of the reflected image occurs to position 44. Thus, the reflected image is not superimposed onto the primary image of the adjacent pixel and displayed information is not lost.

Figure 3:
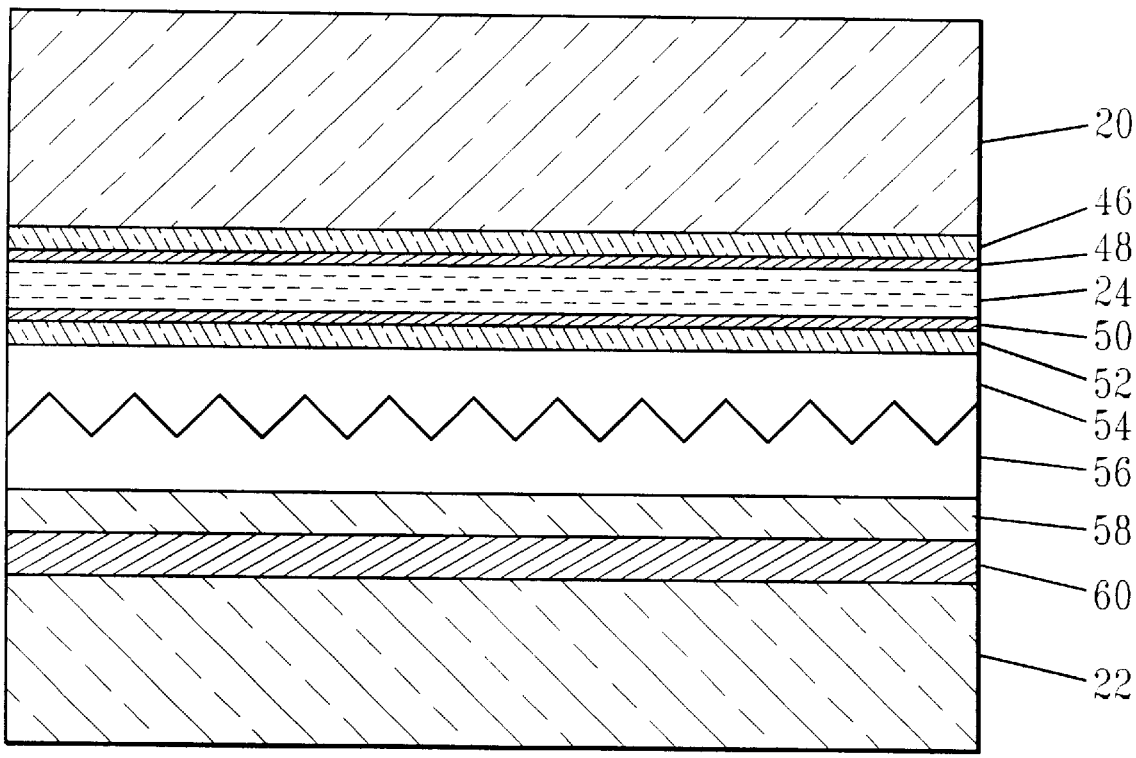
FIG. 3 is a more detailed cross-sectional view of the display cell illustrated in FIG. 2.

FIG. 3 shows a more detailed cross-sectional view of the cell of FIG. 2 exemplifying a preferred embodiment of the present invention. Specifically, the cell of FIG. 3 comprising a first substrate 20 coated on its inside surface with a transparent electrode 46 and a liquid crystal alignment layer 48. The second substrate 22 is coated with a light absorbing layer 60, a transparent layer 58 of low refractive index, a prism layer 56 of high refractive index, a planarizing layer 54, a transparent electrode 52 and a liquid crystal alignment layer 50. The two substrates contain a layer of liquid crystals 24.

Figure 4:
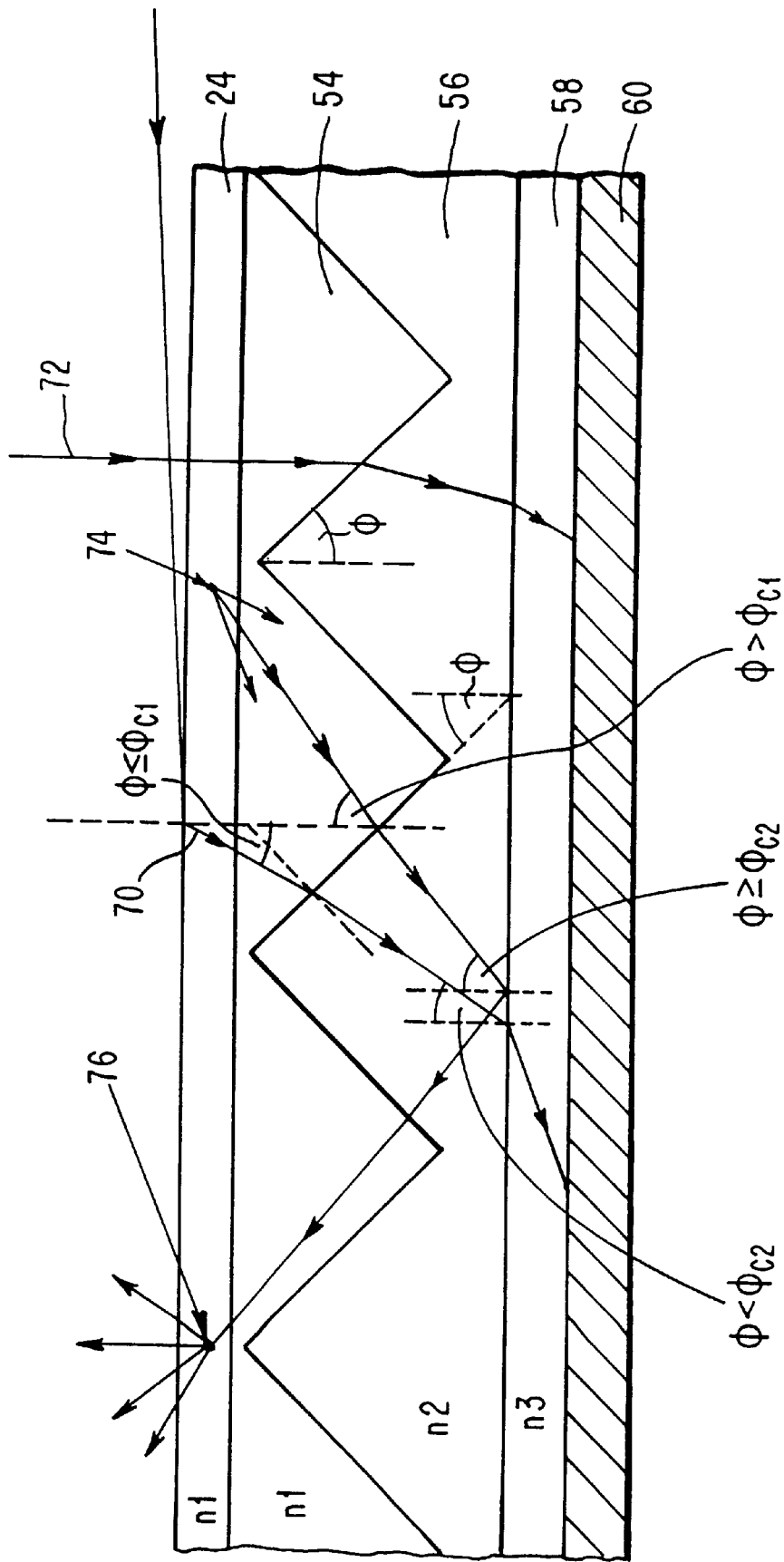
FIG. 4 shows details of the structure of the prism layer, in particular of the refractive indices of layers 54, 56 and 58 and the pitch angle (theta) of the prism layer used in FIG. 2.

FIG. 4 represents a simplified cross-sectional view through liquid crystal layer 24, low index planarizing layer 54, prism layer 56, low index layer 58 and light absorbing layer 60. For the purpose of clarity in this figure, alignment layer 50 and transparent electrode 52 have been omitted. In addition, it has been assumed that the refractive index $n_1$ of liquid crystal layer 24 is equal to that of low index planarizing layer 54.

A critical feature of the present invention is that the pitch angle, $\phi$, of the prism layer is adjusted so that light propagating through the display at an angle $\leq \phi_{c1}$, such that rays 70 and 72, will be incident on the interface between layers 56 and 58 at angles less than the critical angle, $\phi_{c2}$, and will be transmitted through low index layer 58 and will be absorbed by light absorbing layer 60. Thus, light not scattered by the liquid crystal layer will be absorbed. Light which is scattered at angles $>\phi_{c1}$, such as the ray emanating from position 74, will be totally internally reflected at the interface between layers 56 and 58 back through the liquid crystal layer where it will be scattered a second time, at point 76 predominantly towards the viewer. The optimum value of $\phi$ will be a function of $n_1$, $n_2$, and $n_3$.

Under some conditions of display use, it may be preferred that the selectively reflective layer is designed to become reflective at angles less than $\phi_{c1}$, this case the usable viewing angle will be reduced, but the degree of enhancement of back scatter will be increased.

The distance between successive ridges of the prism layer should be substantially less than the pixel dimension so that the action of the selective reflector produces a uniform enhancement of the back scatter efficiency. However, it should not be so small that diffraction effects occur. In practice, a pitch of about 1.5 to about 5 μm is satisfactory.

Processes by which the structure of the present invention can be made will now be described. Referring first to FIG. 3, a layer of light absorbing material 60 is deposited on to the rear of substrate 22. The light absorbing material can be made of any light absorbing polymeric material such as a dyed or pigmented polyamide, a composite metal/oxide or cermet material. In this particular embodiment, light absorbing layer 60 can be a conductor or an insulator. If conducting, layer 60 must be appropriately patterned to avoid pixel-pixel short circuits. If insulating, light absorbing layer 60 can be left as a continuous sheet. A layer 58 of a low refractive index transparent material is then deposited on to light absorbing material 60. Layer 58 should be of as low a refractive index as possible and its properties must be compatible with the processing requirements of the layers subsequently deposited. Typically, a refractive index, n, of from about 1.35 to about 1.45 will be sufficiently low. A fluorinated material such as Teflon PFA (n=1.35) is an example of a suitable material.

Figure 5:
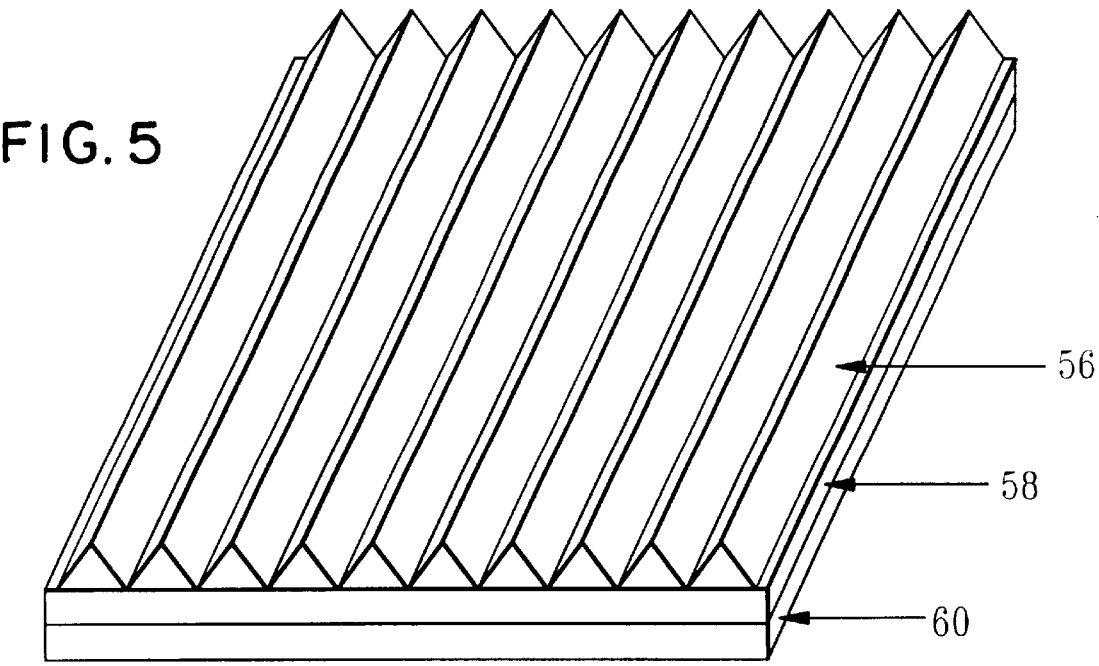
FIG. 5 shows a perspective view of prism layer 56, low refractive index layer 58 and the light absorbing layer 60. In this example, the prism layer 56 is in the form of triangular section ridges.
Figure 6:
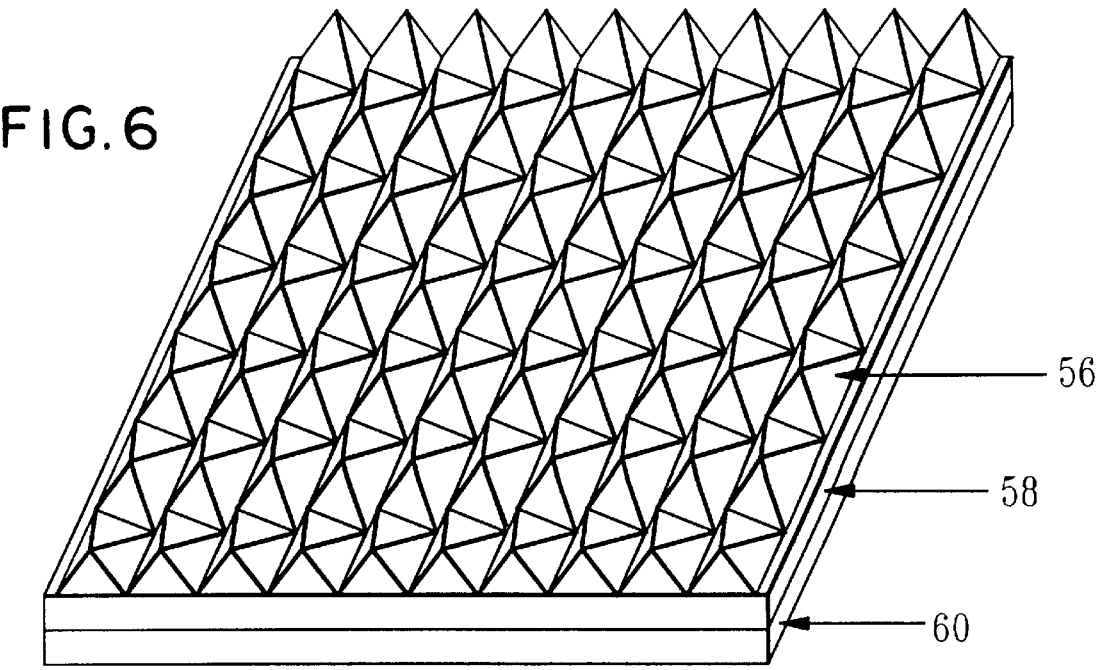
FIG. 6 shows a view similar to FIG. 5, but in this case prism layer 56 is in the form of a close packed rectilinear array square pyramids.

High index prism layer 56 is then deposited. Ideally, this layer comprises a composite of silicon and zirconium oxides. Such a layer has a high refractive index (n≈2.1) and is amorphous, the latter property being required for the patterning process. The layer can be deposited by sputtering or any other known deposition process. An Al etch mask is then deposited on to layer 56 and patterned either with an array of slits to produce the ridged pattern shown in FIG. 5 or with an array of square apertures to produce the rectilinear array of pyramids depicted in FIG. 6. Layer 56 is then reactively sputter etched in an oxygen atmosphere. During this process, the Al etch mask is gradually eroded, enlarging the apertures in it. The process may be optimized by adjusting the etch mask thickness and the initial dimensions of the apertures so that high index prism layer 56 becomes etched through at the instant the etch mask is completely removed. This produces sharp ridges and apexes. The angle of the ridges and the prism angle ø, as depicted in FIG. 4, are adjusted by varying the etch process conditions to optimize the differential etch rate of the prism layer and the etch mask. In practice, values of ø between 35° and 50° can be obtained.

The high index prism layer 56 is then spun coated with a planarizing layer 54 of a low index material which can be, but is not necessarily, the same as layer 58. A layer of transparent electrode material 52 is then deposited on to planarizing layer 54 and an aligning layer 50 is deposited on to layer the transparent electrode.

Figure 7:
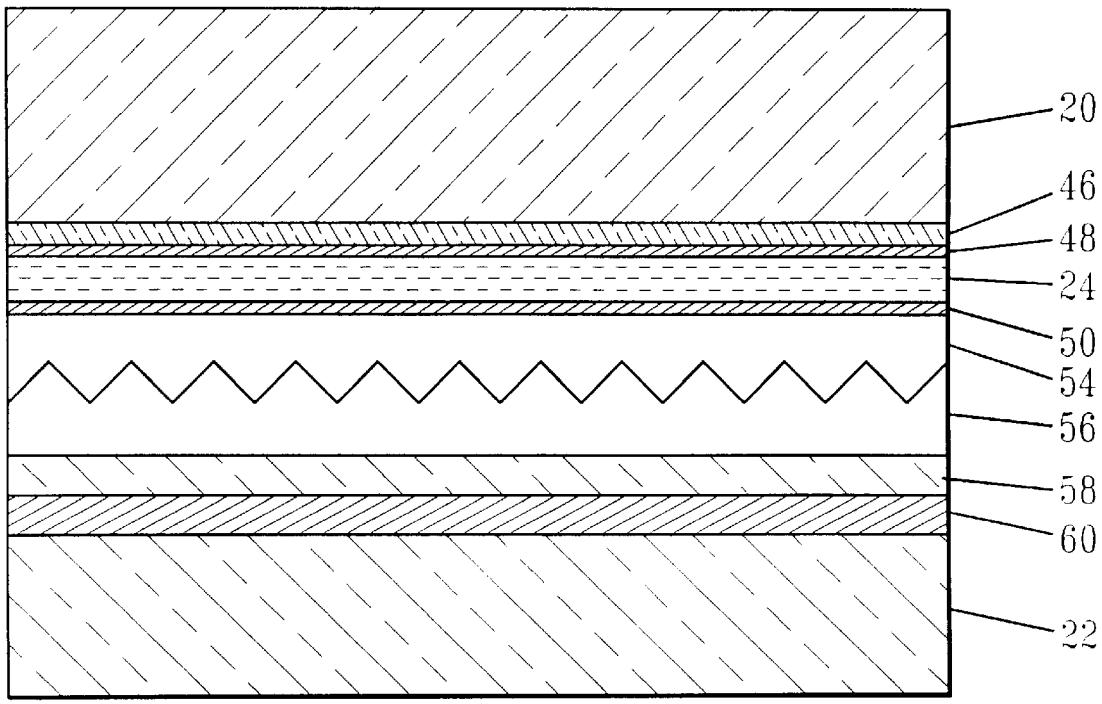
FIG. 7 shows another embodiment of the present invention in which light absorbing layer 60 acts also as the lower display electrode.
Figure 8:
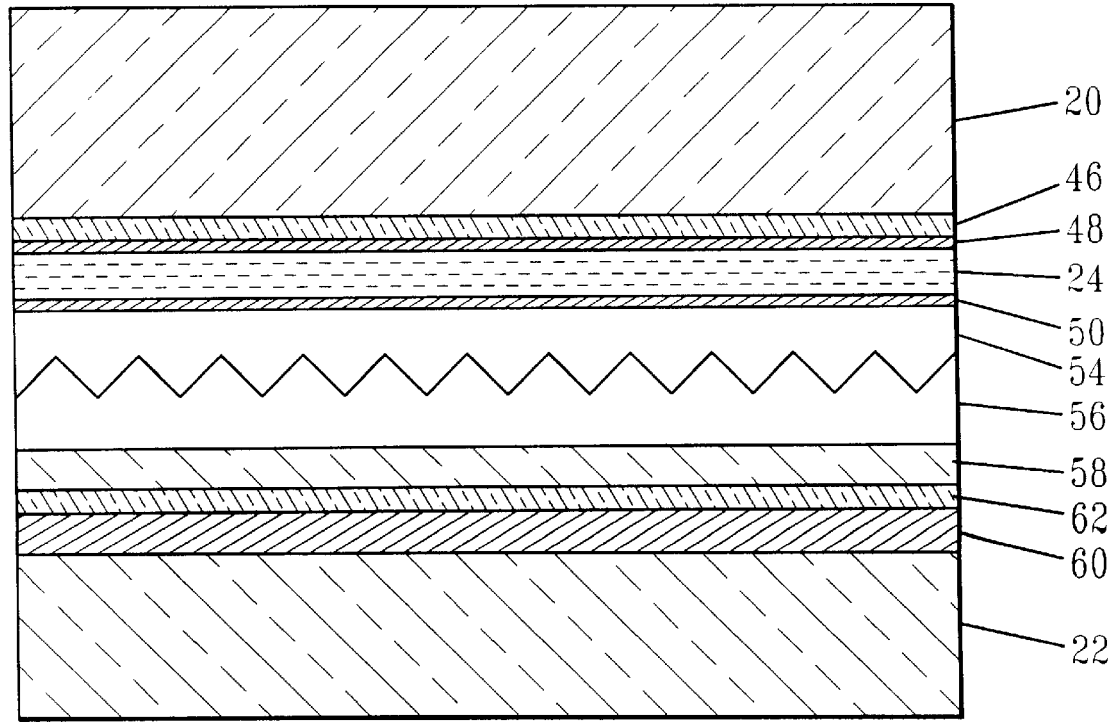
FIG. 8 shows yet another embodiment of the present invention in which the rear display electrode is formed of transparent conducting material 62 deposited on to light absorbing layer 60.

The above process serves to illustrate one method by which the selectively reflection layer can be made. The structures depicted in FIG. 7 and 8 can be made by a similar process, either by eliminating layer 52 and choosing a conducting layer 60 (FIG. 7) or by depositing and patterning a transparent conducting layer 62 between layers 58 and 60 (FIG. 8).

The above process is however not optimized for volume manufacture and alternative processes exits which may be better optimized for manufacture. An alternative method is to mold the required ridge or pyramid pattern. A mold can be made in a material which is subsequently removed during processing or the pattern can be molded directly in a material which can be spun coated and then converted by a firing process to a high index layer which retains the required surface geometry. Sol gels of $ZrO_2/SiO_2$ mixtures would be suitable for this purpose. Because of the processing temperatures involved (>250°–300° C.), it is necessary to make layers 58 or 60 as an adhesive layer and then remove the sacrificial substrate. The above described process can easily be used in volume manufacture. Other alternative processes are also known in the art and thus could be used for volume expansion.

While the invention has been particularly shown and described with respect to preferred embodiments thereof, it will be understood by those skilled in the art that the foregoing and other changes in form and details may be made therein without departing from the spirit and scope of the present invention.

What is claimed is:

1. A display device comprising a structured solid state selectively reflective layer formed inside a display cell, said display cell comprising at least a display transducer, wherein said structured solid state selectively reflective layer transmits light that is not scattered by said display transducer and reflects a portion of light that is scattered in a forward direction by the display transducer towards a viewer.

2. The display device of claim 1 wherein the display transducer comprises liquid crystals.

3. The display device of claim 2 wherein the liquid crystals are polymer stabilized cholesteric liquid crystals.

4. The display device of claim 2 wherein the liquid crystals are polymer dispersed liquid crystals.

5. The display device of claim 2 wherein the liquid crystals are surface stabilized cholesteric liquid crystals.

6. The display device of claim 2 wherein the liquid crystals can be switched by means of an electric field from a transparent to a scattering state.

7. The display device of claim 2 wherein the liquid crystals can be switched by thermal means from a transparent to a scattering state.

8. The display device of claim 1 wherein the selectively reflective layer has a thickness of a least about 1 µm.

9. The display device of claim 1 wherein the selectively reflective layer is a high or low refractive index material.

10. The display device of claim 9 wherein the high refractive index material is a mixed oxide amorphous material.

11. The display device of claim 9 wherein the low refractive index material is a fluorinated polymeric material.

12. The display device of claim 1 wherein the selectively reflective layer is formed as a series of ridges substantially triangular in cross-section.

13. The display device of claim 1 wherein the selectively reflective layer is formed as a close packed rectilinear array of square pyramids.

14. The display device of claim 1 wherein a transparent electrode layer is formed on top of the selectively reflective layer.

15. The display device of claim 1 wherein a transparent electrode layer is formed between the selectively reflective layer and a light absorbing layer.

16. The display device of claim 1 wherein the selectively reflective layer is designed to become reflective at angles less than a predetermined critical angle for propagation of light therethrough.

* * * * *

UNITED STATES PATENT AND TRADEMARK OFFICE
CERTIFICATE OF CORRECTION

PATENT NO. : 6,130,733
DATED : October 10, 2000
INVENTOR(S) : A.C. Lowe

It is certified that error appears in the above-identified patent and that said Letters Patent are hereby corrected as shown below:

Column 2, Line 43: "array square" should read --array of square--

Column 4, Line 25: "...this case" should read --In this case...--

Signed and Sealed this

Fifteenth Day of May, 2001

Attest:

NICHOLAS P. GODICI

Attesting Officer  Acting Director of the United States Patent and Trademark Office